United States Patent Office.

ALEXANDER BÖHRINGER, OF STUTTGART, WURTEMBERG, GERMANY.

METHOD OF PRODUCING MONALCYLISED HYDRO-BASES.

SPECIFICATION forming part of Letters Patent No. 282,488, dated August 7, 1883.

Application filed January 22, 1883. (No specimens.)

*To all whom it may concern:*

Be it known that I, ALEXANDER BÖHRINGER, a citizen of Germany, residing at Stuttgart, in the Kingdom of Wurtemberg, have invented a new and useful Improvement in Methods of Producing Monalcylised Hydro-Bases, of which the following is a specification.

My present invention relates to the manufacture of medicinal chemicals; and it consists in the preparation or production of monalcylised hydro-bases by hydrogenizing the tertiary bases which previously, by alcylisation, have been transformed into salts of the ammonium bases; or, in other words, the preparation of monalcylised hydro-bases which already contain the alcohol rest or residue. The direct introduction of alcohol radicals, particularly those of the methyl-rest, into secondary bases hardly ever leads to a uniform product, because, the alcylisation going farther, the quarternary base is formed, while an equivalent quantity of secondary basis remains unchanged, and more or less expensive operations for the separation of the different substances become necessary.

My improved method or process is applicable to the preparation or production of monalcylised hydro-bases of the chinoline series—viz., monalcylised hydro-chinoline and its homologues, and monalcylised hydro-lepidines and their homologues, as well as hydro-chinolines with more complicated carbon nucleus, such as phenantren-chinoline, &c. By this method the tertiary basis poorer in hydrogen is alcylised, as the first step, and the salt of the alcylised quarternary basis is thus obtained alone or without side products for hydrogenization, to which it is then subjected. I have thus produced, for example, methyl-hydro-chinoline, a new base, so far as I am informed, and various novel salts thereof, which I will now set forth by way of illustration. Methyl-hydro-chinoline is a colorless liquid strongly refracting the light. It gradually darkens by exposure to the air, and has a slightly aromatic taste. It is a weak base, boiling at 246.5° centigrade. (Hydro-chinoline boils at 248° centigrade.) It combines with various acids, as hereinafter described.

To produce or prepare mono-methyl-hydro-chinoline I take chinoline and convert it, for instance, by its treatment with methyl-chloride, into the chloride of methyl-chinoline, and then through the action of reducing agents, particularly through finely-divided metals (iron or tin for example) in acid solution, (hydrochloric acid or acetic acid, for example,) convert said chloride into the salt of methyl-hydro-chinoline, which corresponds to the acid that has been used, (the chlorhydrate, for example,) from which the said base is liberated, so as to be readily driven off by steam or taken up by solvents. The following proportions, by weight, yield a practically favorable result: Two parts of chinoline are converted, in connection with one part of methyl-chloride, into chloro-methyl-chinoline, and this is converted in hydrochloric solution by gradually adding three parts of granulated tin into the chlorhydrate or methyl-hydro-chinoline. The corresponding reaction is as follows, to wit: $C_9H_7NCH_3Cl + H_4 = C_9H_{10}N - CH_3HCl$. The proportions given above yield, as aforesaid, a practically satisfactory result, but may vary within wide limits without material change of result. They may consequently be so varied without departing from my invention.

The methyl-hydro-chinoline, in combination with sulphuric acid, forms acid or hyperacidated salts, which crystallize well and are not affected by air. The salt formed by hydriodic acid melts at 168° centigrade, and crystallizes also easily and well, and is obtained in rhomboidal plates from aqueous as well as from alcoholic solutions. It dissolves less readily in water than the acid and hyperacidated sulphate. The nitrate crystallizes also well, and is unchangeable, while the acid tartrate undergoes partial decomposition by water. The methyl-hydro-chinoline is, besides, characterized by combining with methyl of iodine with nearly explosive violence, producing the beautifully-crystallizing iodur of dimethyl-hydro-chinoline-ammonia, which melts at 175° centigrade. The lepidine obtained from the residue of quinine-manufacture gives, under the same conditions, the corresponding methyl-hydro-lepidine, which boils about 7° higher than the described methyl-hydro-chinoline, but shows great similarity with the salts described above.

Methyl-hydro-chinoline and methyl-hydro-lepidine (from cinchoine-lepidine) have, in common, when applied as salts, decided antifebrile qualities, which manifest themselves by a considerable diminution of the temperature, even under normal conditions. It is therefore to be anticipated that these preparations will find various practical applications as medicines.

I do not claim herein either of the aforesaid products, as various products may be obtained from different tertiary bases by means of the same, or substantially the same, method or process; but I hereby reserve the right to claim the same in future applications for Letters Patent of the United States.

I claim as my invention and desire to patent under this specification—

1. The within-described method or process of preparing or producing monalcylated hydro-bases for use as medicines, consisting in first converting the tertiary bases into salts of the ammonium bases by alcylisation, and then hydrogenizing said salts to produce acid salts which liberate said monalcylated hydro-bases, substantially as herein specified.

2. The within-described method or process of preparing or producing mono-methyl-hydro-chinoline, consisting in treating chinoline with methyl-chloride to produce chloride of methyl-chinoline, and then, by the action of suitable reducing agents, converting said chloride into an acid salt of methyl-hydro-chinoline from which the said monalcylated hydro-base is liberated, substantially as herein specified.

In testimony whereof I have hereunto set my hand in the presence of two subscribing witnesses.

ALEXANDER BÖHRINGER.

Witnesses:
EDWARD RETTICH.
R. GRIESIUF.